(12) United States Patent
Sheng et al.

(10) Patent No.: US 11,920,843 B2
(45) Date of Patent: *Mar. 5, 2024

(54) CHILLER SUCTION FLOW LIMITING WITH INPUT POWER OR MOTOR CURRENT CONTROL

(71) Applicant: Johnson Controls Tyco IP Holdings LLP, Milwaukee, WI (US)

(72) Inventors: Shimin Sheng, Wuxi (CN); Xiuping Su, Wuxi (CN); Shenglong Wang, York, PA (US); Curtis Christian Crane, York, PA (US); Mark Robinson Bodell, II, York, PA (US); Justin Patrick Kauffman, York, PA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,666

(22) Filed: Nov. 14, 2022

(65) Prior Publication Data

US 2023/0144991 A1 May 11, 2023

Related U.S. Application Data

(63) Continuation of application No. 17/059,963, filed as application No. PCT/CN2018/089063 on May 30, 2018, now Pat. No. 11,499,768.

(51) Int. Cl.
*F25B 49/02* (2006.01)
*F25B 1/00* (2006.01)

(52) U.S. Cl.
CPC ............ *F25B 49/022* (2013.01); *F25B 1/00* (2013.01); *F25B 2339/02* (2013.01);
(Continued)

(58) Field of Classification Search
CPC .......... F25B 2339/02; F25B 2500/28; F25B 2600/02; F25B 2600/024; F25B 2700/195; F25B 2700/197
See application file for complete search history.

(56) References Cited

U.S. PATENT DOCUMENTS 3,970,112 A * 7/1976 Bernard ............... F16K 13/10
                                                137/251.1
4,494,382 A * 1/1985 Raymond ............. F25B 5/00
                                                417/280

(Continued)

FOREIGN PATENT DOCUMENTS

CN    101603751 A    12/2009
CN    201688616 U    12/2010
(Continued)

OTHER PUBLICATIONS

PCT International Search Report for PCT Application No. PCT/CN2018/089063 dated Jan. 18, 2019, 4 pgs.
(Continued)

*Primary Examiner* — Jerry-Daryl Fletcher
*Assistant Examiner* — Daniel C Comings
(74) *Attorney, Agent, or Firm* — Fletcher Yoder, P.C.

(57) ABSTRACT

A chiller includes an evaporator, a compressor including a prime mover, a first pressure sensor that detects a first pressure in the evaporator, a second pressure sensor that detects a second pressure in a condenser, and a controller. The controller determines a predicted energy level of the compressor based on the first pressure and the second pressure, the predicted energy level associated with liquid droplet flow into the compressor, compares the predicted energy level to an operating energy level, and modifies the
(Continued)

at least one of the input power and the input current to the prime mover based on the comparison satisfying a modification condition.

20 Claims, 4 Drawing Sheets

(52) U.S. Cl.
CPC ..... *F25B 2500/28* (2013.01); *F25B 2600/024* (2013.01); *F25B 2700/195* (2013.01); *F25B 2700/197* (2013.01)

(56) References Cited

U.S. PATENT DOCUMENTS

| | | | |
|---|---|---|---|
| 4,663,942 A | | 5/1987 | Kanazawa |
| 9,562,710 B2 * | | 2/2017 | Pham ........................ F24F 11/30 |
| 11,499,768 B2 * | | 11/2022 | Sheng ........................ F25B 1/00 |
| 2009/0095002 A1 | | 4/2009 | McSweeney et al. |
| 2009/0187286 A1 | | 7/2009 | Magalhaes Medeiros Neto et al. |
| 2011/0061411 A1 | | 3/2011 | Kim et al. |
| 2014/0137573 A1 * | | 5/2014 | Lin ........................ F25B 49/02 |
| | | | 62/126 |

FOREIGN PATENT DOCUMENTS

| | | | | |
|---|---|---|---|---|
| CN | 103765011 A | | 4/2014 | |
| CN | 103994072 A | | 8/2014 | |
| CN | 104052371 A | | 9/2014 | |
| EP | 2844931 A1 | | 3/2015 | |
| JP | 2004060457 A | | 2/2004 | |
| JP | 2011169475 A | | 9/2011 | |
| JP | 2016217559 A | | 12/2016 | |
| KR | 20050031321 A | * | 4/2005 | .......... F25B 2500/28 |
| KR | 20050031321 A | | 4/2005 | |
| KR | 100656164 B1 | | 12/2006 | |
| WO | 2009058975 A1 | | 5/2009 | |
| WO | WO-2014169212 A1 | * | 10/2014 | .............. F04B 49/02 |

OTHER PUBLICATIONS

Chinese Office Action for CN Application No. 201880093961.8, dated Oct. 22, 2021, 10 pgs.
Japanese Office Action for JP Application No. 2020-566823, dated Dec. 3, 2021, 3 pgs.
European Search Report for EP Application No. 18921213.7, dated Apr. 7, 2022, 6 pgs.

* cited by examiner

CHILLER SUCTION FLOW LIMITING WITH INPUT POWER OR MOTOR CURRENT CONTROL

CROSS-REFERENCE TO RELATED APPLICATIONS

This is a continuation application of U.S. patent application Ser. No. 17/059,963, entitled "CHILLER SUCTION FLOW LIMITING WITH INPUT POWER OR MOTOR CURRENT CONTROL," filed Nov. 30, 2020, which is a U.S. National Stage Application of International Patent Application No. PCT/CN2018/089063, entitled "CHILLER SUCTION FLOW LIMITING WITH INPUT POWER OR MOTOR CURRENT CONTROL," filed May 30, 2018, each of which is hereby incorporated by reference in its entirety for all purposes.

BACKGROUND

Refrigerants can transfer heat between fluids and may be employed in a variety of applications, such as heating, ventilating, and air conditioning (HVAC) systems, heat pumps, or power generation in Organic Rankine Cycles (ORE). The refrigerant can be transported within a refrigerant piping system, which includes pipes, pipe fittings, valves, and the like. The refrigerant piping system transports the refrigerant between various vessels and equipment within the HVAC system, such as compressors, turbines, pumps, evaporators, and condensers. The refrigerant may undergo one or more phase changes within the refrigerant piping system, such that liquid refrigerant and vaporous refrigerant may both be present in the HVAC system.

SUMMARY

One implementation of the present disclosure is a chiller. The chiller includes an evaporator that receives a first flow of refrigerant, transfers heat to the first flow of refrigerant, and outputs a second flow of refrigerant. The chiller includes a compressor that receives the second flow of refrigerant via tubing between the evaporator and the compressor, the compressor including a prime mover that performs work on the second flow of refrigerant based on at least one of an input power to the prime mover and an input current to the prime mover. The chiller includes a first pressure sensor that detects a first pressure of refrigerant in the evaporator. The chiller includes a second pressure sensor that detects a second pressure of refrigerant in a condenser of the chiller. The chiller includes a controller that determines a predicted energy level of operation of the compressor based on the first pressure and the second pressure, the predicted energy level associated with liquid droplet flow in the second flow of refrigerant received by the compressor, compares the predicted energy level to an operating energy level of the compressor, and modifies the at least one of the input power and the input current to the prime mover based on the comparison satisfying a modification condition.

Another implementation of the present disclosure is a method of chiller suction flow limiting. The method includes receiving, by a controller, a first pressure from an evaporator pressure sensor coupled to an evaporator. The method includes receiving, by the controller, a second pressure from a condenser pressure sensor coupled to a condenser. The method includes determining, by the controller, a predicted energy level of operation of a compressor based on the first pressure and the second pressure, the predicted energy level associated with liquid droplet flow from the evaporator to the condenser. The method includes comparing, by the controller, the predicted energy level to an operating energy level of the compressor. The method includes modifying at least one of an input power and an input current to a prime mover of the compressor based on the comparison satisfying a modification condition.

Still another implementation of the present disclosure is a chiller controller. The chiller controller includes one or more processors and a memory device storing computer-readable instructions that when executed by the one or more processors, cause the one or more processors to receive, at a state detector, a first pressure from an evaporator pressure sensor coupled to an evaporator; receive, at the state detector, a second pressure from a condenser pressure sensor coupled to a condenser; determine, by an energy predictor, a predicted energy level of operation of a compressor based on the first pressure and the second pressure, the predicted energy level associated with liquid droplet flow from the evaporator to the condenser; compare, by a compressor controller, the predicted energy level to an operating energy level; and modify; by the compressor controller, at least one of an input power and an input current to a prime mover of the compressor based on the comparison satisfying a modification condition.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
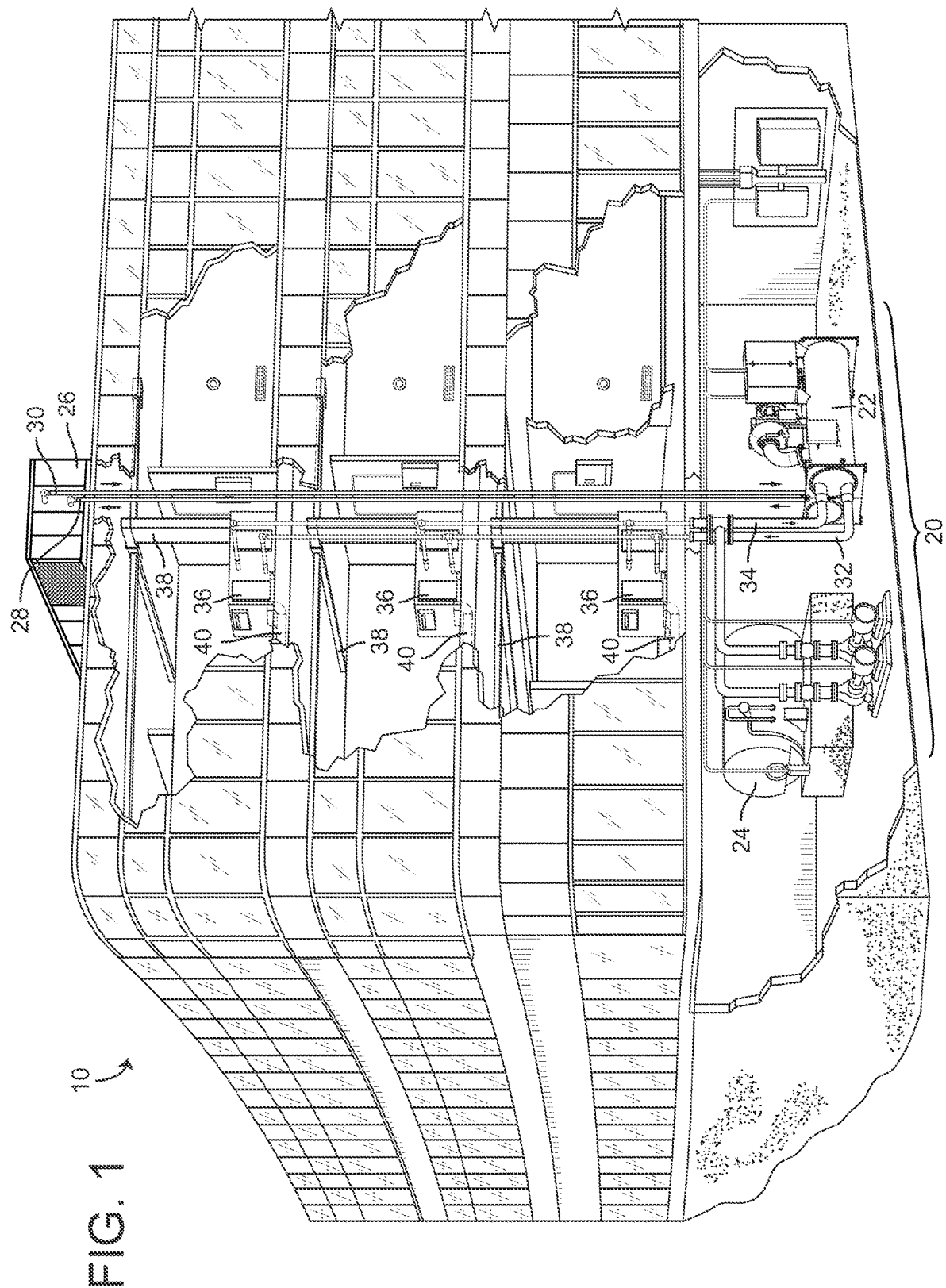
FIG. 1 is a perspective view of a building serviced by a heating, ventilation, and air conditioning (HVAC) system, according to an exemplary embodiment.

The present disclosure relates generally to the field of refrigeration systems. More particularly, the present disclosure relates to chiller suction flow limiting with input power or motor current control. A refrigeration system can include a chiller, which can include an evaporator, condenser, compressor, and tubing connecting these and various other components. The evaporator evaporates refrigerant to provide net cooling of process fluid, such as water, flowing through the tubing. It can be desirable for the evaporator to generate a dry, saturated vapor from the refrigerant, and for the compressor to thus receive the dry, saturated vapor based on suction generated by the compressor. However, in some situations, the refrigerant outputted by the evaporator includes liquid droplets, which are pulled up with the high velocity vapor flow based on the suction from the compressor. In addition, size, weight, power, and cost considerations may make it desirable to reduce the size of the evaporator to meet the minimum needs of a design capacity of the refrigeration system. However, as lift or differential pressure across the compressor is lowered due to chiller operating conditions, the compressor may provide a higher capacity and suction flow rate, which can increase gas velocity in the evaporator and cause liquid droplets to carry over into the compressor. These effects can decrease the efficiency of the chiller, and can damage mechanical components of the compressor.

The present solution can address such considerations by implementing chiller suction flow limiting with input power or motor current control, in order to effectively manage compressor operation to reduce or eliminate liquid droplet flow from the evaporator to the compressor. For example, systems and methods in accordance with the present solution can predict power or current levels corresponding to a design velocity limit of the evaporator, at which liquid droplet flow to the compressor could be expected to occur, and use a controller to limit further power or current increase to prevent the liquid droplet flow to the compressor (e.g., liquid flow carryover). In some embodiments, a chiller includes an evaporator that receives a first flow of refrigerant, transfers heat to the first flow of refrigerant, and outputs a second flow of refrigerant. The chiller includes a compressor that receives the second flow of refrigerant via tubing between the evaporator and the compressor, the compressor including a prime mover that performs work on the second flow of refrigerant based on at least one of an input power to the prime mover and an input current to the prime mover. The chiller includes a first pressure sensor that detects a first pressure of refrigerant in the evaporator. The chiller includes a second pressure sensor that detects a second pressure of refrigerant in a condenser of the chiller. The chiller includes a controller that determines a predicted energy level of operation of the compressor based on the first pressure and the second pressure, compares the predicted energy level to an operating energy level associated with liquid droplet flow in the second flow of refrigerant received by the compressor, and modifies the at least one of the input power and the input current to the prime mover based on the comparison satisfying a modification condition. As such, if the predicted energy level is too high (e.g., is greater than the operating energy level), the controller can limit the power or current, as appropriate, to the prime mover to reduce or eliminate a risk of liquid droplet flow into the compressor, which might otherwise occur if a design velocity limit of the evaporator is exceeded.

HVAC System

FIG. 1 depicts a perspective view of a building 10. Building 10 is serviced by a heating, ventilation, and air conditioning system (HVAC) system 20. HVAC system 20 can include a chiller 22, a boiler 24, a rooftop cooling unit 26, and a plurality of air-handling units (AHUs) 36. HVAC system 20 uses a fluid circulation system to provide heating and/or cooling for building 10. The circulated fluid may be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 may be transported to AHUs 36 via piping 32. AHUs 36 may place the circulated fluid in a heat exchange relationship with an airflow passing through AHUs 36. For example, the airflow may be passed over piping in fan coil units or other air conditioning terminal units through which the circulated fluid flows. AHUs 36 may transfer heat between the airflow and the circulated fluid to provide heating or cooling for the airflow. The heated or cooled air may be delivered to building 10 via an air distribution system including air supply ducts 38 and may return to AHUs 36 via air return ducts 40. HVAC system 20 can include a separate 36 on each floor of building 10. In other embodiments, a single AHU (e.g., a rooftop AHU) may supply air for multiple floors or zones. The circulated fluid from AHUs 36 may return chiller 22 or boiler 24 via piping 34.

The refrigerant in chiller 22 can be vaporized upon absorbing heat from the circulated fluid. The vapor refrigerant may be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant may be discharged into a condenser within chiller 22. In some embodiments, water (or another fluid) flows through tubes in the condenser of chiller 22 to absorb heat from the refrigerant vapor, thereby causing the refrigerant to condense. The water flowing through tubes in the condenser may be pumped from chiller 22 to a cooling unit 26 via piping 28. Cooling unit 26 may use fan driven cooling or fan driven evaporation to remove heat from the water. The cooled water from cooling unit 26 may be delivered back to chiller 22 via piping 30 and the cycle repeats.

Figure 2:
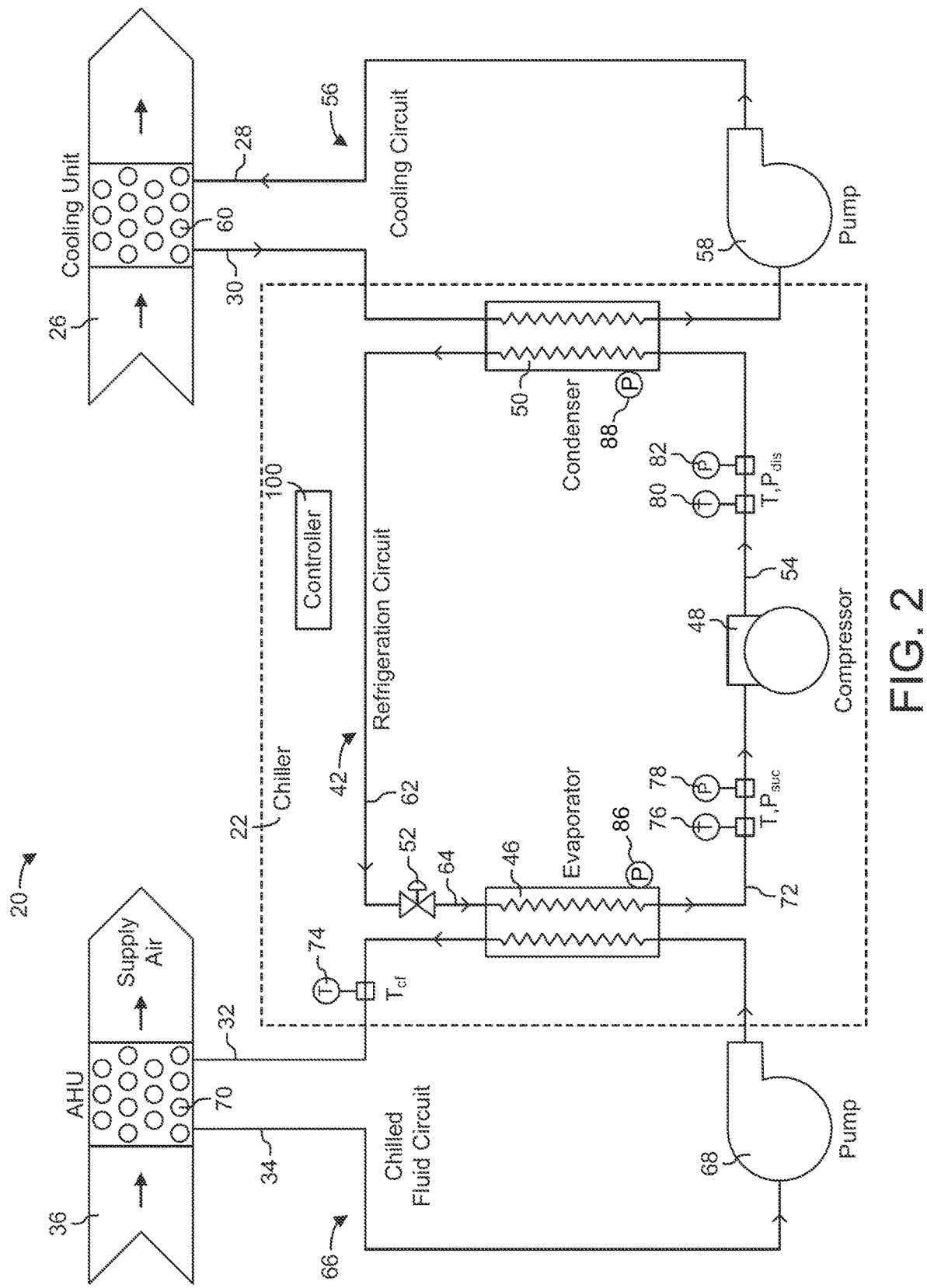
FIG. 2 is a block diagram illustrating a portion of the HVAC system of FIG. 1 in greater detail, showing a refrigeration circuit configured to circulate a refrigerant between an evaporator and a condenser, according to an exemplary embodiment.

FIG. 2 depicts a block diagram illustrating a portion of HVAC system 20, according to an exemplary embodiment. Chiller 22 can include a refrigeration circuit 42 and a controller 100. Refrigeration circuit 42 can include an evaporator 46, a compressor 48, a condenser 50, and an expansion valve 52. Compressor 48 may be configured to circulate a refrigerant through refrigeration circuit 42. Compressor 48 can be operated by controller 100. Compressor 48 may compress the refrigerant to a high pressure, high temperature state and discharge the compressed refrigerant into a compressor discharge line 54 connecting the outlet of compressor 48 to the inlet of condenser 50. The compressor 48 can be or include a screw compressor, a semi-hermetic screw compressor, or compressor 48 is a hermitic or open screw compressor, for example. Compressor 48 can also be or include a scroll compressor, a reciprocating compressor, a centrifugal compressor, or still another type of compressor.

Condenser 50 may receive the compressed refrigerant from compressor discharge line 54. Condenser 50 may also receive a separate heat exchange fluid from cooling circuit 56 (e.g., water, a water-glycol mixture, another refrigerant, etc.). Condenser 50 may, be configured to transfer heat from the compressed refrigerant to the heat exchange fluid, thereby causing the compressed refrigerant to condense from a gaseous refrigerant to a liquid or mixed fluid state. The cooling circuit 56 can include a heat recovery circuit configured to use the heat absorbed from the refrigerant for heating applications. The cooling circuit 56 can include a pump 58 for circulating the heat exchange fluid between condenser 50 and cooling unit 26. Cooling unit 26 may include cooling coils 60 configured to facilitate heat transfer between the heat exchange fluid and another fluid (e.g., air) flowing through cooling unit 26. The cooling unit 26 can include a cooling tower. The heat exchange fluid can reject heat in cooling unit 26 and return to condenser 50 via piping 30.

The refrigeration circuit 42 can include a line 62 connecting an outlet of condenser 50 to an inlet of expansion device 52. Expansion device 52 can expand the refrigerant in refrigeration circuit 42 to a low temperature and low pressure state. Expansion device 52 may be a fixed position device or variable position device (e.g., a valve). Expansion device 52 may be actuated manually or automatically (e.g., by controller 100 via a valve actuator) to adjust the expansion of the refrigerant passing therethrough. Expansion device 52 may output the expanded refrigerant into line 64 connecting an outlet of expansion device 52 to an inlet of evaporator 46.

Evaporator 46 may receive the expanded refrigerant from line 64. Evaporator 46 may also receive a separate chilled fluid from chilled fluid circuit 66 (e.g., water, a water-glycol mixture, another refrigerant, etc.). Evaporator 46 may be configured to transfer heat from the chilled fluid to the expanded refrigerant in refrigeration circuit 42, thereby cooling the chilled fluid and causing the refrigerant to evaporate. The chilled fluid circuit 66 can include a pump 68 for circulating the chilled fluid between evaporator 46 and AHU 36. AHU 36 may include cooling coils 70 configured to facilitate heat transfer between the chilled fluid and another fluid (e.g., air) flowing through AHU 36. The chilled fluid may absorb heat in AEU 36 and return to evaporator 46 via piping 34. Evaporator 46 may output the heated refrigerant to compressor suction line 72 connecting the outlet of evaporator 46 with the inlet of compressor 48.

The chilled fluid circuit 66 can include a chilled fluid temperature sensor 74 positioned along piping 32. Chilled fluid temperature sensor 74 may be configured to detect a temperature $T_{cf}$ of the chilled fluid (e.g., the leaving chilled liquid temperature, etc.) flowing within piping 32 between evaporator 46 and TT 36. The refrigeration circuit 42 can include a suction temperature sensor 76 positioned along compressor suction line 72. Suction temperature sensor 76 may be configured to detect a temperature $T_{suc}$ of the refrigerant flowing within compressor suction line 72 between evaporator 46 and compressor 48 (i.e., the temperature of the refrigerant entering compressor 48). The refrigeration circuit 42 can include a suction pressure sensor 78 positioned along compressor suction line 72. Suction pressure sensor 78 may be configured to detect a pressure $P_{suc}$ of the refrigerant flowing within compressor suction line 72 between evaporator 46 and compressor 48 (i.e., the pressure of the refrigerant entering compressor 48). The refrigeration circuit 42 can include a discharge temperature sensor 80 positioned along compressor discharge line 54. Discharge temperature sensor 80 may be configured to detect a temperature $T_{dis}$ of the refrigerant flowing within compressor discharge line 54 between compressor 48 and condenser 50 (i.e., the temperature of the refrigerant exiting compressor 48). The refrigeration circuit 42 can include a discharge pressure sensor 82 positioned along compressor discharge line 54. Discharge pressure sensor 82 may be configured to detect a pressure $P_{dis}$ of the refrigerant flowing within compressor discharge line 54 between compressor 48 and condenser 50 (i.e., the pressure of the refrigerant exiting compressor 48).

Refrigeration circuit 42 can include an evaporator pressure sensor 86 that detects a pressure $P_{evap}$ of the refrigerant flowing within evaporator 46, and a condenser pressure sensor 88 that detects a pressure $P_{cond}$ of the refrigerant flowing within condenser 50. Sensors 86, 88 may be similar to sensors 78, 82; sensors 78, 82 may respectively be used to perform the functions of sensors 86, 88 relating to measuring pressures associated with evaporator 46 and compressor 48 as described further herein. Sensors 86, 88 may be positioned at various points in or adjacent to evaporator 46 and condenser 50, respectively, to detect respective pressure $P_{evap}$ and $P_{cond}$.

Compressor 48 includes a prime mover 84 (e.g., a motor). The prime mover 84 can be a fixed speed drive or a variable speed drive. Controller 100 can control operation of prime mover 84, such as to transmit control signals to prime mover 84 to control a rotation speed, flow rate, or other operational parameter of compressor 48. The controller 100 can control operation of prime mover 84 based on at least one of a power or a current corresponding to operation of compressor 48. Depending on operational conditions in refrigeration circuit 42, liquid droplets of refrigerant may flow from evaporator 46 to compressor 48. Controller 100 can control operation of prime mover 84 to reduce or eliminate liquid droplet flow from evaporator 46 to compressor 48.

Chiller Suction Flow Limiting with Input Power or Motor Current Control

Figure 3:
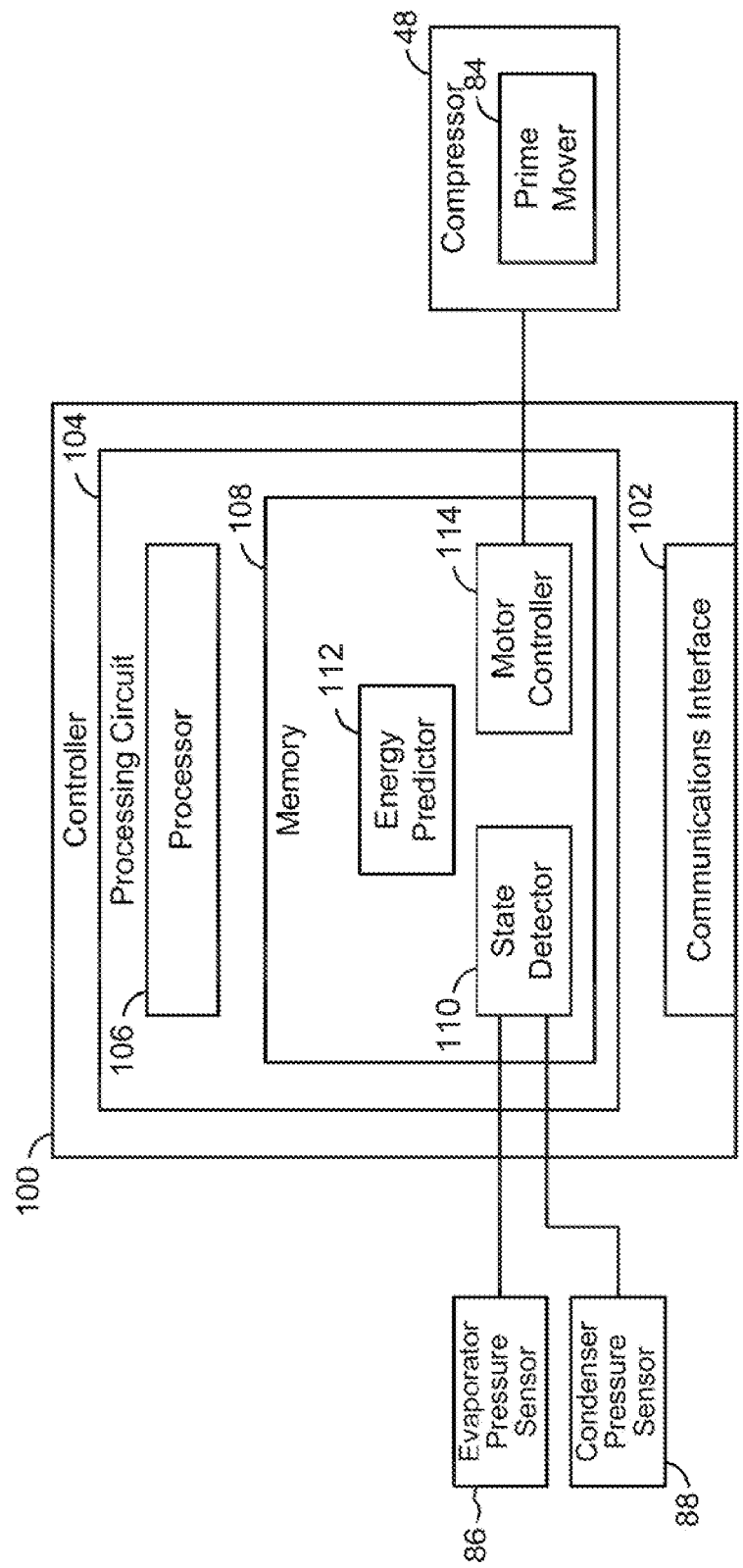
FIG. 3 is a block diagram of a controller of the refrigeration circuit of FIG. 2, according to an exemplary embodiment.

FIG. 3 depicts a block diagram of a refrigeration system 150 including controller 100, according to an exemplary embodiment. Controller 100 can control operation of compressor 48, such as to control operation of compressor 48 based on at least one of input power or motor current control. Power and current, such as input power, input current, motor power, motor current, can include power or current to the refrigeration system 150 (e.g., to the chiller), power or current to a motor controller of the refrigeration system 150, power or current to a drive of compressor 48 (e.g., variable speed drive), power or current to a motor of compressor 48, or other power or current used to cause compressor 48 to move. Controller 100 can use power and current limits to protect compressor 48 (e.g., prime mover 84), or limit building energy usage, and such limits can be very stable in terms of control methodology (e.g., controller 100 need not rely on detected liquid droplets as an input to a feedback control loop, and thus can prevent liquid droplet carryover before it occurs). For example, controller 100 can control a power of operation of a variable speed drive prime mover 84, or can control a current of operation of a fixed speed drive prime mover 84. Controller 100 can determine a predicted energy level of operation of compressor 48 at which suction flow from evaporator 46 to compressor 48 might be expected to cause liquid droplets to flow into compressor 48, compare the predicted energy level to an actual operating energy level of compressor 48, and determine to limit capacity of compressor 48 based on the comparison to protect compressor 48 from liquid droplet flow.

The controller 100 can include a communications interface 102 and a processing circuit 104. Communications interface 102 may include wired or wireless interfaces (e.g., jacks, antennas, transmitters, receivers, transceivers, wire terminals, etc.) for conducting data communications with various systems, devices, or networks. For example, communications interface 102 may include an Ethernet card and/or port for sending and receiving data via an Ethernet-based communications network. In some embodiments, communications interface 102 includes a wireless transceiver (e.g., a WiFi transceiver, a Bluetooth transceiver, a NEC transceiver, ZigBee, etc.) for communicating via a wireless communications network. Communications interface 102 may be configured to communicate via local area networks (e.g., a building LAN, etc.) and/or wide area networks (e.g., the Internet, a cellular network, a radio communication network, etc.) and may use a variety of communications protocols (e.g., BACnet, TCP/IP, point-to-point, etc.).

The communications interface 102 can facilitate receiving inputs from various sensors. The sensors may include, for example, chilled fluid temperature sensor 74 configured to detect the temperature of the chilled fluid at an outlet of evaporator 46, suction pressure sensor 78 configured to detect the pressure of the refrigerant in compressor suction line 72, discharge pressure sensor 82 configured to detect the pressure of the refrigerant in compressor discharge line 54, and/or other sensors of chiller 22 and/or HVAC system 20 (e.g., suction temperature sensor 76, discharge temperature sensor 80, chilled fluid temperature sensor 74, etc.). Communications interface 102 may receive the inputs directly from the sensors, via a local network, and/or via a remote communications network. Communications interface 102 may enable communications between controller 100 and compressor 48.

The processing circuit 104 can include a processor 106 and memory 108. Processor 106 may be a general purpose or specific purpose processor, an application specific integrated circuit (ASIC), one or more field programmable gate arrays (FPGAs), a group of processing components, or other suitable processing components. Processor 106 may be configured to execute computer code or instructions stored in memory 108 (e.g., fuzzy logic, etc.) or received from other computer readable media (e.g., CDROM, network storage, a remote server, etc.) to perform one or more of the processes described herein.

Memory 108 may include one or more data storage devices (e.g., memory units, memory devices, computer-readable storage media, etc.) configured to store data, computer code, executable instructions, or other forms of computer-readable information. Memory 108 may include random access memory (RAM), read-only memory (ROM), hard drive storage, temporary storage, non-volatile memory, flash memory, optical memory, or any other suitable memory for storing software objects and/or computer instructions. Memory 108 may include database components, object code components, script components, or any other type of information structure for supporting the various activities and information structures described in the present disclosure. Memory 108 may be communicably connected to processor 106 via processing circuit 104 and may include computer code for executing (e.g., by processor 106) one or more of the processes described herein.

The memory 108 can includes various modules for completing processes described herein. More particularly, memory 108 includes a state detector 110, an energy predictor 112, and a compressor controller 114. While various modules with particular functionality are shown in FIG. 3, controller 100 and memory 108 may include any number of modules for completing the functions described herein. For example, the activities of multiple modules may be combined as a single module and additional modules with additional functionality may be included. The controller 100 can further control other processes beyond the scope of the present disclosure, including but not limited to controlling operation of various components of refrigeration system 150 based on a desired or expected load condition.

State detector 110 can receive state data from various sensors of refrigeration system 150. For example, state detector 110 can receive pressure data from evaporator pressure sensor 86 and from condenser pressure sensor 88. State detector 110 can also receive temperature data from temperature sensors.

Energy predictor 112 can receive the state data from state detector 110 and determine a predicted energy level of operation of compressor 48 based on the received state data. The predicted energy level can correspond to at least one of compressor speed, compressor capacity, water flow rate, water temperature, suction volume flow rate, compressor performance, motor performance, and starter performance.

Energy predictor 112 can determine the predicted energy level based on a first pressure received by state detector 110 from evaporator pressure sensor 86 and a second pressure received by state detector 110 from condenser pressure sensor 88. Energy predictor 112 can execute an energy prediction function to calculate the predicted energy level.

The energy prediction function may include one or more calculation parameters that the energy predictor 112 can apply to the first pressure and second pressure to calculate the predicted energy level. The one or more calculation parameters can be determined based on experimental and/or simulation testing of operation of refrigeration system 150. For example, the one or more calculation parameters can be determined by identifying energy levels associated with various values of evaporator pressure and condenser pressure, and fitting a curve, function, or other representation to the energy levels based on the values of evaporator pressure and condenser pressure. The energy levels may be identified by operating the refrigeration system 150 (or a driveline thereof) at various operating conditions. The energy levels may be identified by operating the refrigeration system 150 at part-load conditions, which may provide a more accurate representation of the behavior of the refrigeration system when the one or more calculation parameters are used to predict the energy levels. It will be appreciated that calculation parameter(s) determined for a first refrigeration system 150 may be applied to various other refrigeration systems 150. The one or more calculation parameters may be determined for a specific refrigeration system using inputs such as capacity, water flow rates, and water temperatures, with feedback values such as evaporator pressure, condenser pressure, suction volume flow rate, and input current (or input power), and executing an iterative process due to dependencies between evaporator pressure (or saturation temperature), suction volume flow limit, capacity, and desired volume flow rate. Where the calculation parameters are determined based on a driveline of the refrigeration system 150 (e.g., to extrapolate the determined calculation parameters to other units having a similar driveline), performance parameters (e.g., compressor performance, motor performance, starter performance) can be determined based on boundary condition variables of compressor 48 (e.g., suction pressure, volume flow rate (or non-dimensional flow rate, theta), and discharge pressure (or non-dimensional head, omega)), to determine the corresponding input current (or input power). As such, if the values of the boundary condition variables (e.g., volume flow rate or theta are) selected to be at the appropriate limit values, then the driveline calculations can directly provide the data needed to determine the calculation parameters. It will be appreciated that the calculation parameters can be determined using processing circuit 104, or a processing circuit of a device remote from refrigeration system 150 (or from a driveline) that is operated to identify relationships between evaporator pressure, condenser pressure, and liquid droplet flow.

Energy predictor 112 can select a particular energy prediction function to execute based on an operating characteristic of compressor 48, which may be stored by energy predictor 112. The operating characteristic may indicate whether prime mover 84 of compressor 48 operates in a variable speed mode of operation or a fixed speed mode of operation. If the operating characteristic indicates that prime mover 84 operates in a variable speed mode of operation, energy predictor 112 can select the energy prediction function according to Equation 1:

$$E_{VSD} = (a + b \cdot p_{evap}) \cdot \left(\frac{p_{cond}}{p_{evap}}\right)^c \qquad \text{Eqn. 1}$$

If the operating characteristic indicates that prime mover 84 operates in a fixed speed mode of operation, energy predictor 112 can select the energy prediction function according to Equation 2:

$$E_{FSD} = (a + b \cdot p_{evap}) \cdot \ln\left(c + \frac{p_{cond}}{p_{evap}}\right) \qquad \text{Eqn. 2}$$

As such, energy predictor 112 can execute the appropriate energy prediction function using the calculation parameters and the first and second pressures (e.g., $p_{evap}$=first pressure, $p_{cond}$=second pressure) to calculate the predicted energy level. It will be appreciated that the values of the calculation parameters can be determined by fitting curves of the form shown in Equation 1 or Equation 2, as appropriate, to identified values of energy level as a function of evaporator pressure and condenser pressure. An iterative optimization process may be used to determine the values of the calculation parameters. The functions shown in Equation 1 and Equation 2 may be linearized (e.g., by taking a logarithm, such as the natural logarithm, of both sides of the respective equations) to reduce the computational requirements for determining the calculation parameters by enabling the use of a linear fit method, such as linear least squares methods.

Compressor controller 114 can control operation of compressor 48 (e.g., control operation of prime mover 84). Compressor controller 114 can output a control signal corresponding to a desired input power or input current to compressor 48, including to limit the input power or input current as appropriate. Compressor controller 114 can use the operating characteristic of compressor 48 to determine whether to generate the control signal to control the input power (e.g., if compressor 48 operates in a variable speed mode of operation) or the input current (e.g., if compressor 48 operates in a fixed speed mode of operation). The compressor controller 114 may initially calculate the input power or the input current based on input variables such as desired water flow rates, water temperatures, or other variables representative of performance of the refrigeration system 150. The compressor controller 114 can limit the initially calculated input power or input current to reduce or eliminate liquid droplet flow into compressor 48.

Compressor controller 114 compares the predicted energy level determined by energy predictor 112 to an operating energy level. The predicted energy level may correspond to an energy level, given certain values of evaporator pressure and condenser pressure, at which liquid droplet flow into compressor 48 from evaporator 46 may be expected to occur. For example, the predicted energy level may correspond to an energy level at which a design velocity limit of evaporator 46 is exceeded, or at which liquid droplet flow has been determined to occur through experimental and/or simulation testing. The operating energy level can be a current energy level of compressor 48; as such, compressor controller 114 can use the comparison to determine whether compressor 48 is operating at a condition which may exceed the predicted energy level at which liquid droplet flow into compressor 48 from evaporator 46 may be expected to occur.

Compressor controller 114 can measure at least one of actual input current and actual input power. For example, compressor controller 114 can include an input current sensor, such as a current transformer, to measure actual input current. Compressor controller 114 can include an input power sensor, such as a voltage sensor that can be used to determined actual input power (e.g., based on the actual input current and the actual input power). Compressor controller 114 can determine the operating energy level based on the at least one of the actual input current and the actual input power.

Compressor controller 114 modifies at least one of the input power or the input current to compressor 48 based on the comparison satisfying a modification condition. For example, if the predicted energy level is a value that should not be exceeded, compressor controller 114 can limit the at least one of the input power or the input current responsive to the operating energy level exceeding the predicted energy level (e.g., if operating energy level is greater than predicted energy level, limit the at least one of the input power and the input current). If the predicted energy level is set to a value that triggers limiting, compressor controller 114 can limit the at least one of the input power and the input current responsive to the operating energy level equaling the predicted energy level (e.g., if predicted energy level is equal to operating energy level, limit the at least one of the input power and the input current). Compressor controller 114 can calculate the predicted energy level as at least one of a predicted input current and a predicted input power, such that compressor controller 114 can perform the comparison by comparing at least one of actual input current to predicted input current and actual input power to predicted input power.

If the comparison does not satisfy the modification condition; such as if the operating energy level is less than the predicted energy level, then compressor controller 114 can determine to not limit the input power or the input current; for example, compressor controller 114 can continue to monitor the first and second pressures; compressor controller 114 can determine to increase the at least one of the input power and the input current (if desired performance, such as water flow rates or water temperatures, is indicative of instructions to increase the at least one of the input power and the input current). As such, where measured values of input power and/or input current are above the predicted values, compressor controller 114 can reduce the operating capacity of compressor 48; where measured values of input power and/or input current are below the predicted values, the operating capacity of compressor 48 (and thus refrigeration system 150) is not limited by suction flow, and compressor controller 114 can control the at least one of the input power and the input current by executing various processes, such as by controlling the at least one of the input power and the input current based on $T_{cf}$ of the chilled fluid leaving evaporator 46 as detected by chilled fluid temperature sensor 74 (e.g., by comparing Too a desired value of $T_{cf}$). Compressor controller 114 can execute capacity control of compressor 48 based on one or more of variation of compressor speed using a variable speed drive; compressor suction flow dampers or pre-rotation vane flow throttling; compressor discharge variable geometry diffuser flow throttling; or a capacity control slide valve (e.g., if compressor 48 includes a screw compressor).

Compressor controller 114 can limit the at least one of the input power or the input current by setting the at least one of the input power or the input current to a previous value. For example, compressor controller 114 can maintain a database of power and current values. Responsive to determining to limit the input power or the input current, compressor controller 114 can retrieve a previous value of input power or input current from the history, such as a previous value at a point in time at which compressor controller 114 determined not to modify the at least one of the input power or the input current based on a corresponding previous predicted energy level.

Compressor controller 114 can maintain a database including evaporator pressure, condenser pressure, input power, input current, predicted energy level, and various other operational parameters, along with an indication that the comparison indicated that the input power or input current was to be limited.

Compressor controller 114 can output an alert indicating liquid droplet flow may be occurring based on the comparison. For example, compressor controller 114 can cause communications interface 102 to transmit the alert. The alert may include information such as the operational parameters maintained in the database by compressor controller 114. The alert may include an indication of a value of a performance variable corresponding to the modification condition being satisfied, such as a water flow rate or water temperature resulting in a predicted energy level associated with liquid droplet flow.

Figure 4:
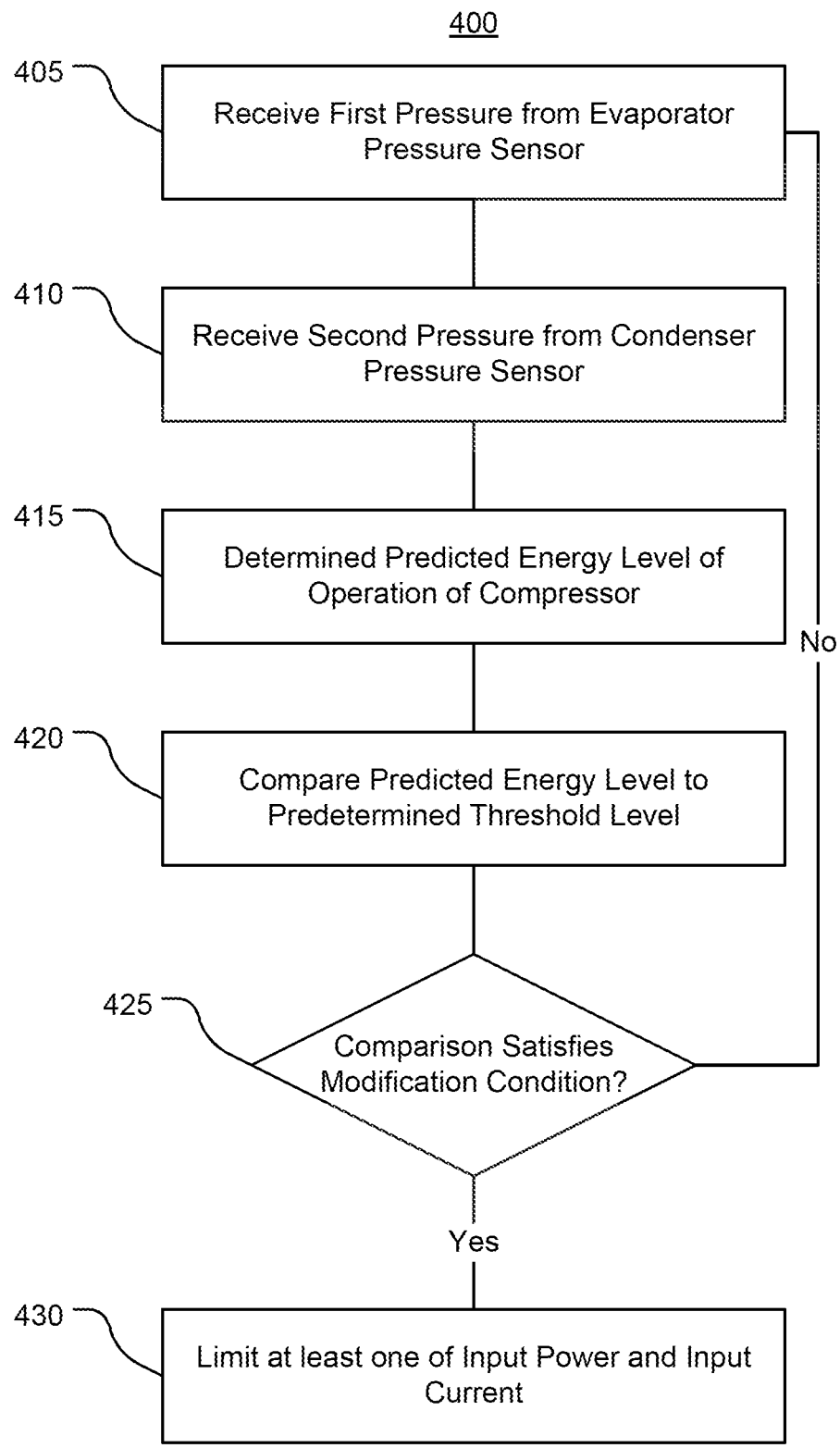
FIG. 4 is a flow diagram of a method of chiller suction flow limiting with input power or motor current control, according to an exemplary embodiment.

FIG. 4 depicts a method 400 of operating a refrigeration system (e.g., a chiller), according to an exemplary embodiment. The method 400 can be performed using the HVAC system of FIG. 1 and/or the refrigeration system 150 of FIGS. 2-3.

At 405, a first pressure is received by a controller from an evaporator pressure sensor. The first pressure can be representative of a pressure of refrigerant flowing through an evaporator. The evaporator can receive a first flow of refrigerant, transfer heat to the first flow of refrigerant, and output a second flow of refrigerant.

At 410, a second pressure is received by the controller from a condenser pressure sensor. The second pressure can be representative of a pressure of refrigerant flowing through the condenser.

At 415, the controller determines a predicted energy level of operation of a compressor. The compressor can receive the second flow of refrigerant via tubing between the evaporator and the compressor. The predicted energy level can be determined using an energy prediction function that uses the first pressure and the second pressure as inputs and evaluates the inputs using predetermined parameters. The compressor can include a prime mover that performs work on the second flow of refrigerant based on at least one of an input power to the prime mover and an input current to the prime mover. The prime mover can include a variable speed drive that the controller drives using input power. The prime mover can include a fixed speed drive that the controller drives using input current.

At 420, the controller compares the predicted energy level of operation of the compressor to an operating energy level. The predicted energy level can be associated with liquid droplet flow in the second flow of refrigerant received by the compressor. The predicted energy level can correspond to a design velocity limit of the evaporator. The compressor controller can determine the operating energy level using at least one of an actual input current and an actual input power.

At 425, the controller determines whether the comparison satisfies a modification condition. The modification condition can correspond to the operating energy level being greater than the predicted energy level, or the operating energy level being greater than or equal to the predicted energy level.

At 430, the controller limits at least one of the input power and the input current to the prime mover based on the comparison satisfying a modification condition. The controller can modify the at least one of the input power and the input current to limit the at least one of the input power and the input current to a value at which liquid droplet flow from the evaporator into the compressor can be reduced or eliminated. The controller can output an alert responsive to modifying the at least one of the input power and the input current to the prime mover based on the comparison satisfying the modification condition. If the comparison does not satisfy the modification condition, such as if the operating energy level is less than the predicted energy level, then the controller can continue to monitor the pressures received from the evaporator pressure sensor and the condenser pressure sensor. If the comparison does not satisfy the modification condition, such as if the operating energy level is less than the predicted energy level, the controller can continue to increase the input power or input current, as appropriate, if the desired performance of the chiller (e.g., desired water flow rates or water temperatures) indicate instructions to increase the input power or input current.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The construction and arrangement of the systems and methods as shown in the various exemplary embodiments are illustrative only. Although only example embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

What is claimed is:

1. A controller for a heating, ventilation, and air conditioning (HVAC) system, comprising:
   one or more processors; and
   a memory device storing computer-readable instructions that, when executed by the one or more processors, cause the one or more processors to:
   receive first data from a first sensor, wherein the first data is indicative of a first pressure within an evaporator of the HVAC system;

receive second data from a second sensor, wherein the second data is indicative of a second pressure within a condenser of the HVAC system;

determine a predicted energy level of operation of a compressor of the HVAC system based on the first pressure and the second pressure, wherein operation of the compressor at the predicted energy level is expected to cause liquid droplet flow from the evaporator to the compressor;

determine an actual operating energy level of the compressor; and adjust operation of the compressor based on a comparison of the predicted energy level and the actual operating energy level.

2. The controller of claim 1, wherein the controller is configured to output a control signal to adjust an input power or an input current provided to the compressor to adjust operation of the compressor.

3. The controller of claim 1, wherein the controller is configured to execute an energy prediction function with the first pressure and the second pressure as inputs of the energy prediction function to determine the predicted energy level.

4. The controller of claim 3, wherein the controller is configured to select a particular energy prediction function from a plurality of energy prediction functions as the energy prediction function.

5. The controller of claim 4, wherein the controller is configured to select the particular energy prediction function based on an operating characteristic of the compressor.

6. The controller of claim 5, wherein the operating characteristic is indicative of the compressor being configured to operate in a variable speed mode or in a fixed speed mode.

7. The controller of claim 1, wherein the controller is configured to determine the actual operating energy level of the compressor based on a measured input current provided to the compressor, based on a measured input power provided to the compressor, or both.

8. The controller of claim 1, wherein the controller is configured to limit operation of the compressor in response to a determination that the actual operating energy level exceeds the predicted energy level.

9. The controller of claim 8, wherein, to limit operation of the compressor, the controller is configured to adjust a speed of the compressor, adjust a suction flow damper of the compressor, adjust a pre-rotation vane of the compressor, adjust a variable geometry diffuser of the compressor, adjust a slide valve of the compressor, or any combination thereof.

10. The controller of claim 1, wherein the predicted energy level corresponds to a design velocity limit of the evaporator.

11. A heating, ventilation, and air conditioning (HVAC) system, comprising:

a controller configured to communicatively couple to a plurality of sensors of the HVAC system and to a compressor of the HVAC system, wherein the controller is configured to:

receive, from a first sensor of the plurality of sensors, data indicative of a first pressure of refrigerant within an evaporator of the HVAC system;

receive, from a second sensor of the plurality of sensors, data indicative of a second pressure of refrigerant within a condenser of the HVAC system;

determine a predicted energy level of operation of a compressor of the HVAC system based on the first pressure of refrigerant and the second pressure of refrigerant, wherein operation of the compressor at the predicted energy level is expected to cause liquid droplet flow from the evaporator to the compressor;

determine an actual operating energy level of the compressor; and limit operation of the compressor based on a determination that the actual operating energy level exceeds the predicted energy level.

12. The HVAC system of claim 11, wherein, to limit operation of the compressor, the controller is configured to limit an input power provided to the compressor, to limit an input current provided to the compressor, or both.

13. The HVAC system of claim 12, wherein the controller is configured to limit the input power provided to the compressor based on a determination that the compressor is configured to operate in a variable speed mode.

14. The HVAC system of claim 12, wherein the controller is configured to limit the input current provided to the compressor based on a determination that the compressor is configured to operate in a fixed speed mode.

15. The HVAC system of claim 12, wherein, to limit operation of the compressor, the controller is configured to adjust a suction flow damper of the compressor, adjust a pre-rotation vane of the compressor, adjust a variable geometry diffuser of the compressor, adjust a slide valve of the compressor, or any combination thereof.

16. The HVAC system of claim 11, wherein the controller is configured to determine the actual operating energy level of the compressor based on a measured input current provided to the compressor and detected by a third sensor of the plurality of sensors, based on a measured input power provided to the compressor and detected by a fourth sensor of the plurality of sensors, or both.

17. A memory device of a heating, ventilation, and air conditioning (HVAC) system controller, wherein the memory device comprises computer-executable instructions stored thereon, and the computer-executable instructions, when executed by one or more processors, are configured to cause the one or more processors to:

receive first data indicative of a first pressure within an evaporator;

receive second data indicative of a second pressure within a condenser;

determine a predicted energy level of operation of a compressor based on the first pressure and the second pressure, wherein operation of the compressor at the predicted energy level is expected to cause liquid droplet flow from the evaporator to the compressor;

determine an actual operating energy level of the compressor; and control operation of the compressor based on a comparison of the predicted energy level and the actual operating energy level.

18. The memory device of claim 17, wherein the computer-executable instructions, when executed by the one or more processors, are configured to cause the one or more processors to execute an energy prediction function with the first pressure and the second pressure as inputs of the energy prediction function to determine the predicted energy level.

19. The memory device of claim 18, wherein the computer-executable instructions, when executed by the one or more processors, are configured to cause the one or more processors to:

select a particular energy prediction function from a plurality of energy prediction functions as the energy prediction function; and select the particular energy prediction function based on an operating characteristic of the compressor, wherein the operating characteristic is indicative of the compressor being configured to operate in a variable speed mode or in a fixed speed mode.

20. The memory device of claim 17, wherein the computer-executable instructions, when executed by the one or more processors, are configured to cause the one or more processors to limit an input power provided to the compressor in response to a determination that the actual operating energy level exceeds the predicted energy level, to limit an input current provided to the compressor in response to the determination that the actual operating energy level exceeds the predicted energy level, or both.

* * * * *